C. F. VENSEL, Jr.
TROLLEY.
APPLICATION FILED MAR. 17, 1910.
1,016,802.
Patented Feb. 6, 1912.
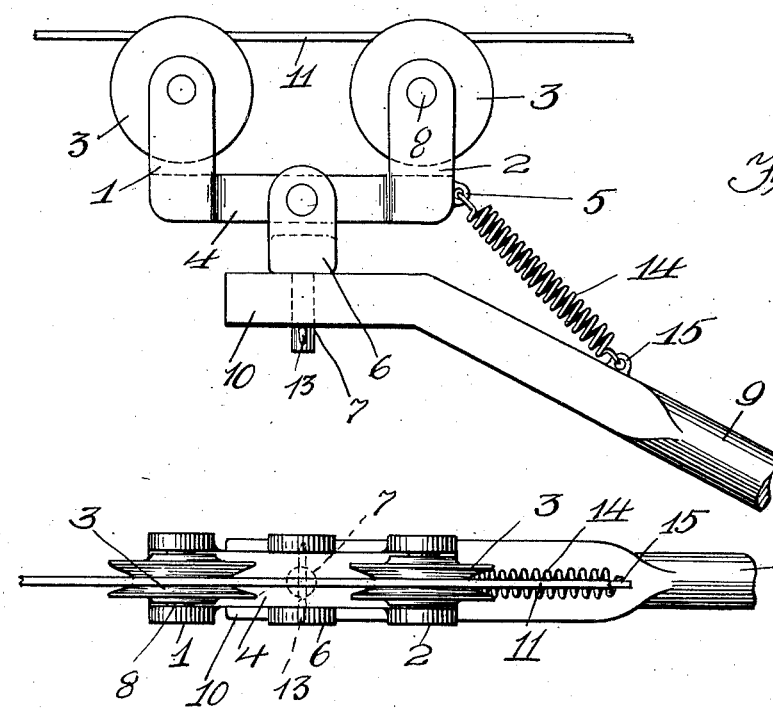
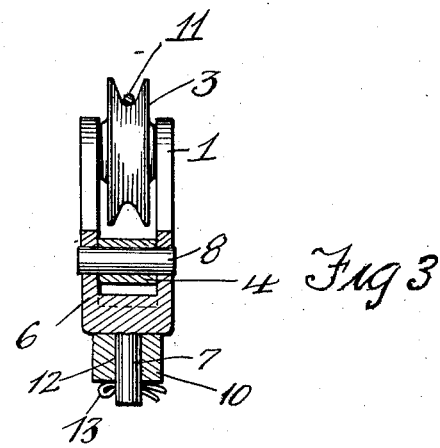
WITNESSES
Samuel Payne
O. H. Butler
INVENTOR
C. F. Vensel, Jr.
by
Attorneys.

UNITED STATES PATENT OFFICE.

CHARLES F. VENSEL, JR., OF CHICORA, PENNSYLVANIA.

TROLLEY.

1,016,802.　　　　Specification of Letters Patent.　　Patented Feb. 6, 1912.

Application filed March 17, 1910. Serial No. 549,892.

*To all whom it may concern:*

Be it known that I, CHARLES F. VENSEL, Jr., a citizen of the United States of America, residing at Chicora, in the county of Butler and State of Pennsylvania, have invented certain new and useful Improvements in Trolleys, of which the following is a specification, reference being had therein to the accompanying drawing.
This invention relates to trolleys and the object thereof is to provide a device of such class in a manner as hereinafter set forth with means for maintaining a trolley wheel in contact with the conductor when traveling around curves and when switching from one track to another.

Further objects of the invention are to provide a trolley which shall be simple in its construction and arrangement, strong, durable, efficient in its use, readily set up in operative position with respect to the trolley pole and inexpensive to manufacture.

With the foregoing and other objects in view, the invention consists of the novel construction, combination and arrangement of parts as hereinafter more specifically described wherein is shown one form of the embodiment of the invention, but it is to be understood that changes, variations and modifications can be resorted to which come within the scope of the claim hereunto appended.

In the drawings, wherein like reference characters denote corresponding parts throughout the several views:—Figure 1 is a side elevation of a trolley in accordance with this invention showing the adaptation thereof in connection with a conductor. Fig. 2 is a top plan view, and, Fig. 3 is a cross-sectional view.

Referring to the drawings by reference characters, 1 and 2 denote yokes, each having journaled in the arms thereof a trolley wheel 3. The yokes 1, 2, are connected together by a bar 4 which is formed integral at its ends with the inner sides of the yokes at the lower ends thereof. The base of the yoke 2 has projecting therefrom an eye 5 for a purpose to be herein referred to.
The reference character 6 denotes a bracket formed with a depending stem 7. The bracket 6 straddles the bar 4 and the latter is pivotally-connected to the former through the medium of a pin 8.
The reference character 9 denotes a trolley pole having an angularly-disposed upper end 10 which when the bar 4 is in normal position, that is, parallel with the conductor 11, extends in parallelism with respect to the said bar 4. The stem 7 projects through the angular upper end of the bar 9, an opening 12 being provided therefor. The stem 7 projects below the angular end 10 and is connected thereto by a cotter pin 13 which projects through an opening in the lower portion of the stem 7. By setting up the bracket 6 with respect to the angular end 10 of the pole 9 in the manner as stated, said bracket 6 is swivelly-connected to the pole.

Attached to an eye 15 projecting from the trolley pole 9 is a coil spring 14 having its opposite end attached to an eye 5 carried by the forward end of the bar 4. This spring has the double function of tending to maintain the bar 4 parallel with the upper end 10 when the trolley harp is swung on its vertical axis, and to tend to hold the rear wheel 3 to contact with the line during movements of the bar on the horizontal axis.

The trolley wheels 3 travel upon the conductor 11 and are mounted in a pivoted support as is obvious, the said support being swivelly-connected with the pole 9, and by such an arrangement the wheels 3 will be caused to travel in the same direction in which the conductor extends.

What I claim is:

The combination of a trolley pole having a substantially horizontal upper end, a trolley harp pivoted on said upper end to swing on a vertical axis, said harp comprising a support forming the vertical pivot member and a wheel carrying member pivoted to said support on a horizontal axis, said wheel carrying member having a pair of spaced-apart wheels positioned on planes in front and rear of said horizontal pivot, and a spring member connecting the forward end of the harp with the pole and adapted to function as a tension member with respect to movements of the harp on both vertical and horizontal pivots.

In testimony whereof I affix my signature in the presence of two witnesses.

CHARLES F. VENSEL, JR.

Witnesses:
　C. L. VENSEL,
　R. M. PONTIUS.

Copies of this patent may be obtained for five cents each, by addressing the "Commissioner of Patents, Washington, D. C."